United States Patent
Kim et al.

(10) Patent No.: US 8,797,961 B2
(45) Date of Patent: Aug. 5, 2014

(54) APPARATUS AND METHODS FOR TRANSMITTING AND RECEIVING MAC PDU USING MAC HEADERS

(75) Inventors: Jeong Ki Kim, Anyang-si (KR); Young Soo Yuk, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 13/390,670

(22) PCT Filed: Sep. 2, 2010

(86) PCT No.: PCT/KR2010/005944
§ 371 (c)(1),
(2), (4) Date: Feb. 15, 2012

(87) PCT Pub. No.: WO2011/028027
PCT Pub. Date: Mar. 10, 2011

(65) Prior Publication Data
US 2012/0147902 A1    Jun. 14, 2012

Related U.S. Application Data

(60) Provisional application No. 61/239,077, filed on Sep. 2, 2009, provisional application No. 61/255,475, filed on Oct. 27, 2009.

(30) Foreign Application Priority Data

Apr. 15, 2010    (KR) .................. 10-2010-0034828

(51) Int. Cl.
*H04W 4/00*    (2009.01)
(52) U.S. Cl.
USPC ........... 370/328; 370/330; 370/329; 370/336; 370/392

(58) Field of Classification Search
USPC ................... 370/474, 395.21, 252, 331, 338; 455/221, 222
See application file for complete search history.

(56) References Cited

U.S. PATENT DOCUMENTS

| 2005/0190719 A1 | 9/2005 | Lee et al. |
| 2007/0041378 A1 | 2/2007 | Ihm et al. |

(Continued)

FOREIGN PATENT DOCUMENTS

| CN | 1875558 A | 12/2006 |
| CN | 101425847 A | 5/2009 |

(Continued)

OTHER PUBLICATIONS

Agiwal et al., "Length Field Usage in MAC Headers," IEEE C802.16m-09/1270r2, IEEE 802.16 Task Group m (TGm), Aug. 31, 2009, 8 pages.

(Continued)

*Primary Examiner* — Kibrom T Hailu
*Assistant Examiner* — Zewdu A Beyen
(74) *Attorney, Agent, or Firm* — Birch, Stewart, Kolasch & Birch, LLP

(57) ABSTRACT

An apparatus and methods for transmitting and receiving MAC PDU (medium access control protocol data unit) using a MAC Header are disclosed. The method includes steps of establishing, by a transmitting end with a receiving end, a connection associated with a service flow, constructing, by the transmitting end, the MAC PDU comprising a MAC header which is configured according to the connection, and transmitting the MAC PDU to the receiving end, wherein the MAC header is general MAC header (GMH) if the connection is associated with a general data packet transmission, and wherein the MAC header is short-packet MAC header (SPMH) if the connection is associated with a small data packet transmission and non-ARQ transmission.

12 Claims, 11 Drawing Sheets

(56) References Cited

U.S. PATENT DOCUMENTS

2009/0092138 A1    4/2009    Joo et al.
2009/0116436 A1    5/2009    Okuda
2010/0135495 A1*   6/2010    Chion et al. ............... 380/273

FOREIGN PATENT DOCUMENTS

| KR | 10-2005-0112406 A | 11/2005 |
|---|---|---|
| KR | 100849143 B1 | 7/2008 |
| KR | 10-2009-0026892 A | 3/2009 |
| KR | 10-2009-0084320 A | 8/2009 |

OTHER PUBLICATIONS

Chion et al., "802.16m MAC PDU Structure," IEEE C802.16m-08/1081, IEEE 802.16 Task Group m (TGm), Sep. 6, 2008, 7 pages.

Xu et al., "MAC Header Structures and Formats," IEEE C802.16m-09/0456, IEEE 802.16 Task Group m (TGm), Feb. 27, 2009, 7 pages.

Zhang et al., "Proposal for IEEE C802.16m MAC Header and Subheader," IEEE C802.16m-08/1059, IEEE 802.16 Task Group m (TGm), Sep. 6, 2008, 13 pages.

* cited by examiner

APPARATUS AND METHODS FOR TRANSMITTING AND RECEIVING MAC PDU USING MAC HEADERS

This application is the National Phase of PCT/KR2010/005944 filed on Sep. 2, 2010, which claims priority under 35 U.S.C. 119(e) to U.S. Provisional Application Nos. 61/239,077 filed on Sep. 2, 2009, 61/255,475 filed on Oct. 27, 2009 and under U.S.C. 119(a) to Patent Application No. 10-2010-0034828 filed in the Republic of Korea on Apr. 15, 2010, all of which are hereby expressly incorporated by reference into the present application.

TECHNICAL FIELD

The present invention relates to a mobile communication system, and more particularly, to an apparatus for transmitting and receiving MAC PDU (medium access control protocol data unit) using a short-packet MAC header (SPMH) and method thereof.

BACKGROUND ART

Generally, an internet based communication system includes a protocol stack consisting of five layers. And, a configuration of each protocol layer is shown in FIG. 1.

FIG. 1 is a diagram for one example of an internet protocol stack used in general.

Referring to FIG. 1, an internet protocol stack consists of an application layer (i.e., a most upper layer), a transport layer, a network layer, a link layer and a physical layer in order. The application layer is the layer for supporting such a network application as FTP (File Transfer Protocol), HTTP (Hypertext Transfer Protocol, TCP (Transmission Control Protocol), UDP (User Datagram Protocol) and the like. The transport layer is the layer responsible for an inter-host data transport function using TCP/UDP. The network layer is the layer for setting a data transport path from a source to a destination via the transport layer and IP protocol. The link layer is the layer responsible for data transmission between neighbor network entities and MAC (medium access control) via PPP/Ethernet protocol and the like. And, the physical layer is a lowest layer for performing a data transmission by a bit unit using a wire/wireless medium.

FIG. 2 is a diagram for operation of each layer for data transmission used in general.

Referring to FIG. 2, a transport layer of a transmitting side generates a new data unit by adding header information H+ to a message payload M received from an application layer that is an upper layer. The transport layer transfers the new data unit to a network layer that is a lower layer. The network layer generates a new data unit by adding header information Hn used by the network layer to the data received from the transport layer and then transfers this data unit to a link layer that is a lower layer.

Subsequently, the link layer generates a new data unit by adding header information H1 used by the link layer to the data received from the upper layer and then transfers it to a physical layer that is a lower layer. The physical layer transfers the data unit received from the link layer to a receiving side.

Meanwhile, a physical layer of the receiving side receives the data unit from the transmitting side and then transfers the received data unit to a link layer that is an upper layer of the physical layer. The receiving side processes a header added to each layer and then transfers the header removed message payload to an upper layer. Through this process, data transceiving is performed between the transmitting side and the receiving side.

For the data transceiving between the transmitting side and the receiving side, as shown in FIG. 2, each layer adds a protocol header and then performs such a control function as data addressing, routing, forwarding, data retransmission and the like.

FIG. 3 is a diagram of a protocol layer model defined in a wireless mobile communication system based on IEEE 802.16 system used in general.

Referring to FIG. 3, a MAC layer belonging to a link layer can consist of three sublayers.

First of all, a service-specific convergence sublayer (service-specific CS) modifies external network data received via a convergence sublayer service access point (CS SAP) into MAC SDUs (service data units) of a MAC sublayer (common part sublayer: CPS) or maps the corresponding data. This layer can include a function of sorting SDUs of external network and then linking a corresponding MAC service flow identifier (SFID) with a connection identifier (CID).

Secondly, a MAC CPS is a layer of providing such a core function of the MAC as system access, bandwidth allocation, connection setting and management and the like. The MAC CPS receives data sorted by a specific MAC connection from various convergence sublayers via the MAC SAP. In this case, a QoS (quality of service) is applicable to the data transmission and scheduling via a physical layer.

Thirdly, a security sublayer is able to provide such a function as authentication, security key exchange and encryption.

The MAC layer is a connection-oriented service and is implemented with the concept of transport connection. When a mobile station registers with a system, a service flow can be provided by a negotiation between a mobile station and a system. If a service request is changed, a new connection can be set. In this case, the transport connection defines mapping between peer convergence processes using MAC and service flow. And, the service flow defines QoS parameters of MAC PDU exchanged in the corresponding connection.

The service flow on the transport connection plays a core role in managing and operating the MAC protocol and provides a mechanism for uplink and downlink QoS managements. In particular, service flows can be combined with a bandwidth allocation process.

In the general IEEE 802.16 system, a mobile station is able to have a 48-bit universal MAC address for each radio interface. This address uniquely defines a radio interface of a mobile station and is usable to set an access of the mobile station during an initial ranging process. Since a base station verifies mobile stations using different identifiers (ID) of the mobile stations, respectively, the universal MAC address is usable as a portion of an authentication process.

Each connection can be identified by a 16-bit connection identifier (CID). While initialization of a mobile station is in progress, two management connection pairs (i.e., uplink and downlink) are established between a mobile station and a base station. And, three pairs including the management connections are selectively usable.

In order for a transmitting stage and a receiving stage to exchange data with each other in the above described layer structure, assume a case of transmitting MAC SDUs (medium access control service data units). In this case, the MAC SDU is processed into MAC PDU (medium access control packet data unit). In order to generate such a MAC PDU, a base station or a mobile station enables a MAC header to be included in the corresponding MAC PDU.

DISCLOSURE OF INVENTION

Technical Problem

Generally, in case of applying segmentation, packing or automatic retransmit request (ARQ) to a packet to transmit, it is able to use a fragmentation & packing extended header among extended headers to enable relevant information to be included in a corresponding MAC PDU.

In this case, data, which is generated in a fixed small size with predetermined periodicity like a voice packet such as VoIP (voice over internet protocol), is generally transmitted without having segmentation or packing. Moreover, in case of performing an error check, hybrid automatic retransmit request (HARQ) reordering applied to MAC PDU unit is used instead of ARQ reordering applied to MAC SDU unit. Therefore, when HARQ reordering is substantially performed on such a packet as VoIP, MAC PDU is accompanied by FPEH to include a sequence number for a corresponding data required for discriminating retransmitted data from new data transmitted next to the retransmitted data.

However, in this case, even if FPEH having a size of minimum 2 byte is added to a VoIP packet, a size of a MAC header becomes equal to or greater than 3 bytes to result in unnecessary resource waste in case of VoIP packet transmission.

Solution to Problem

Accordingly, the present invention is directed to an apparatus for transmitting and receiving MAC PDU (medium access control protocol data unit) using a compact MAC header and method thereof that substantially obviate one or more of the problems due to limitations and disadvantages of the related art.

An object of the present invention is to provide an efficient compact MAC header structure including a sequence number and a method of providing a service using the same.

Another object of the present invention is to provide a method of providing a more efficient service by sharing information on a type of a MAC header to use for MAC PDU, which is to be transmitted, in the course of a service connection performed between a base station and a mobile station for MAC PDU transmission.

A compact MAC header (hereinafter abbreviated CMH) mentioned in the description of embodiments of the present invention can be replaced by a different name. For instance, the compact MAC header is mentioned as a short packet MAC header (hereinafter abbreviated SPMH) which can be used as having the same meaning of the CMH.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method for transmitting a media access control protocol data unit (MAC PDU) in a wireless access system, the method comprising steps of establishing, by a transmitting end with a receiving end, a connection associated with a service flow; constructing, by the transmitting end, the MAC PDU comprising a MAC header which is configured according to the connection; and transmitting the MAC PDU to the receiving end. In this case, the MAC header is general MAC header (GMH) if the connection is associated with a general data packet transmission, and the MAC header is short-packet MAC header (SPMH) if the connection is associated with a small data packet transmission and non-ARQ transmission.

Preferably, the SPMH consists of a flow identifier (FID) field, an extended header group presence indicator (EH) field, a length field and a sequence number (SN) field.

In addition, the small data packet may be a voice over internet protocol (VoIP) data packet which has fixed size and periodic transmission interval.

The FID field of the present invention indentifies the connection used for the transmission of the MAC PDU, the EH field indicates whether an extended header group is present following the SPMH, the length field indicates a length in bytes of the MAC PDU including the SPMH and an extended header if present and the SN field indicates a payload sequence number of the MAC PDU and increments by one for each MAC PDU.

In this case, a size of the FID field is 4 bits, a size of the EH field is 1 bit, a size of the length field is 7 bits, and a size of the SN field is 4 bits.

The SN field is preferably used for an HARQ (hybrid-automatic retransmission request) scheme.

Preferably, the GMH consists of a flow identifier (FID) filed, an extended header group presence indicator (EH) field, and length field. In this case, the FID field indentifies the connection used for the transmission of the MAC PDU, the EH field indicates whether an extended header group is present following the GMH, the length field indicates a length in bytes of the MAC PDU including the GMH and an extended header if present.

In addition, it is preferable that a size of the FID field is 4 bits, a size of the EH field is 1 bit, a size of the length field is 7 bits, and a size of the SN field is 4 bits.

At the present invention, the sizes of the GMH and the SPMH may be the same as two bytes. In addition, the GMH and the SPMH is not encrypted.

The method further comprises step of selecting the MAC header from the GMH, the SPMH and a MAC signaling header (MSH) based on the connection.

According to another embodiment of the present invention, a method for transmitting a media access control protocol data unit (MAC PDU) in a wireless access system, the method comprises steps of configuring a short packet MAC header (SPMH) for a small data packet transmission and non-ARQ transmission, the SPMH only consisting of a flow identifier (FID) field, an extended header group presence indicator (EH) field, a length field and a sequence number (SN) field; constructing a MAC protocol data unit (MAC PDU) comprising the SPMH for the small data packet; and transmitting the MAC PDU to a receiving end. In this case, the SN field indicates a payload sequence number of the MAC PDU and increments by one for each MAC PDU.

The small data packet may be a voice over internet protocol (VoIP) data packet which has fixed size and periodic transmission interval. The SN field is used for a HARQ (hybrid-automatic retransmission request) scheme.

At the another embodiment, the FID field indentifies a connection used for the transmission of the MAC PDU, the EH field indicates whether an extended header group is present following the SPMH, and the length field indicates a length in bytes of the MAC PDU including the SPMH and an extended header if present. In this case, it is preferable that a size of the FID field is 4 bits, a size of the EH field is 1 bit, a size of the length field is 7 bits, and a size of the SN field is 4 bits. That is, a size of the SPMH may be 2 bytes.

According to the another embodiment of the present invention, the method further comprises steps of transmitting a dynamic service addition request (AAI_DSA-REQ) message to create a service flow for the MAC PDU; and receiving a dynamic service addition response (AAI_DSA-RSP) message including a flow identifier indicated by the FID field, wherein the FID field identifies the SPMH.

In the above description, specific terminologies used for embodiments of the present invention are provided to help the understanding of the present invention. And, the use of the specific terminology can be modified into another form within the scope of the technical idea of the present invention. For instance, the MAC PDU is usable by being modified into MPDU.

It is to be understood that both the foregoing general description and the following detailed description are exemplary and explanatory and are intended to provide further explanation of the invention as claimed.

Advantageous Effects of Invention

Accordingly, the present invention provides the following effects or advantages.

First of all, the present invention performs communications more efficiently in a manner that information on a MAC header type is shared in the course of a service connection between a base station and a mobile station.

Secondly, the present invention uses a SPMH including sequence number information necessary for performing HARQ reordering on such a small packet as VoIP, thereby reducing a MAC header overhead according to a presence of an extended header.

Thirdly, a flow identifier (Flow ID) for identifying a corresponding service flow is included in a SPMH, whereby a receiving stage receiving the SPMH is able to reduce a processing overhead generated from a flow mapping process.

It is to be understood that the effects that can be obtained by the present invention are not limited to the aforementioned effects, and another effects, which are not described, will be apparent to those skilled in the art to which the present invention pertains, from the following detailed description of the present invention.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
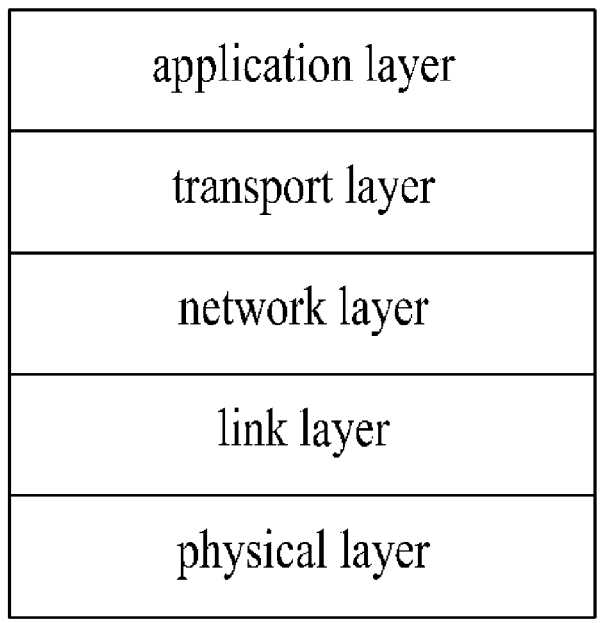
FIG. 1 is a diagram for one example of an internet protocol stack used in general.
Figure 2:
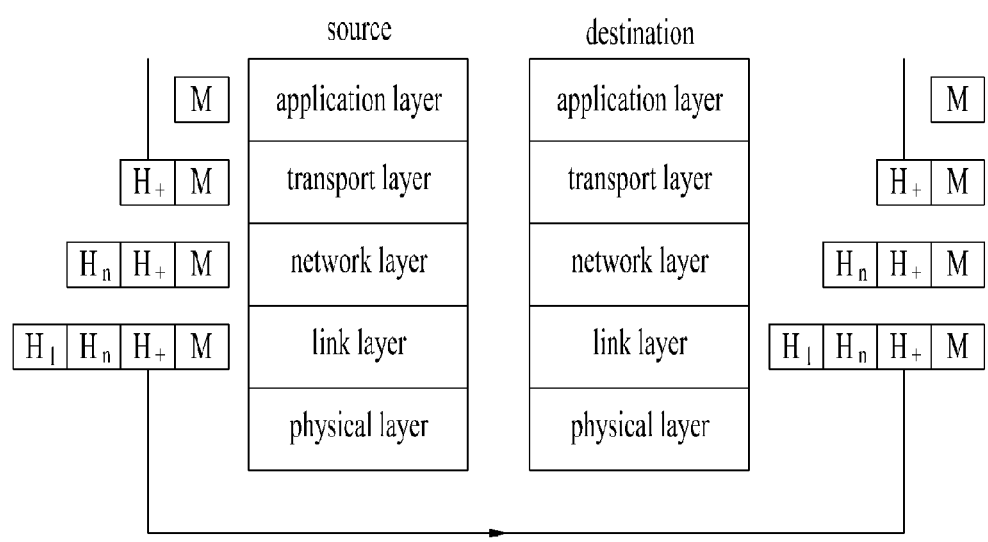
FIG. 2 is a diagram for operation of each layer for data transmission used in general.
Figure 3:
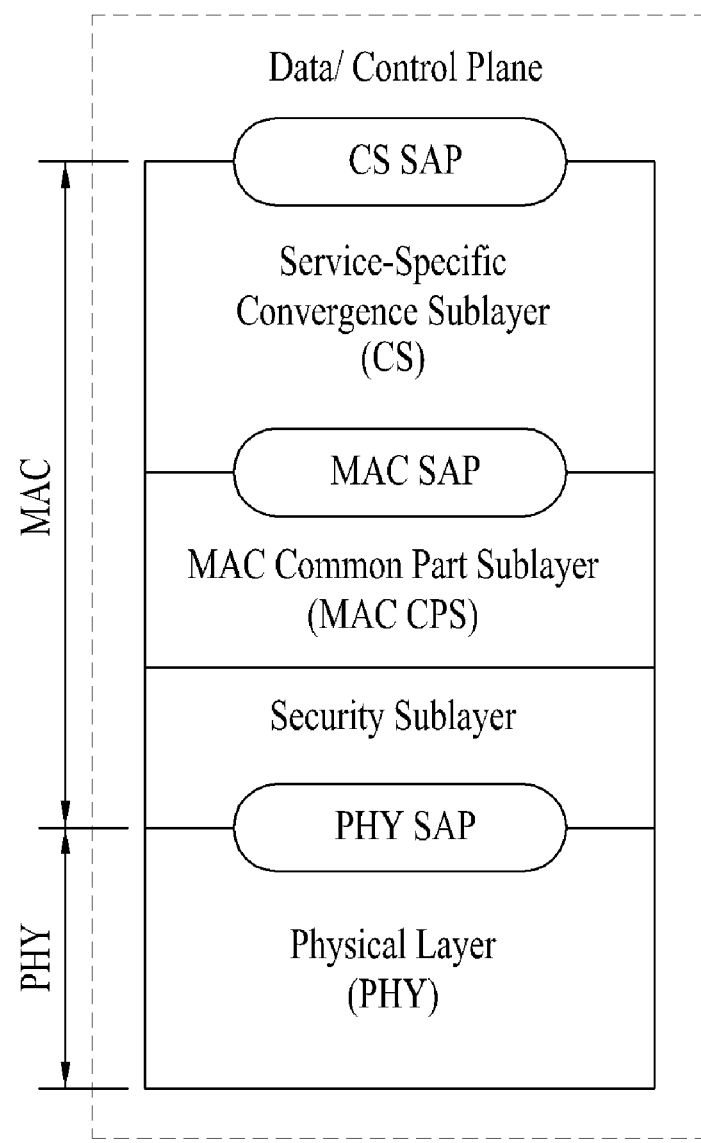
FIG. 3 is a diagram of a layer structure of a general IEEE 802.16 system.

Reference will now be made in detail to the preferred embodiments of the present invention, examples of which are illustrated in the accompanying drawings.

The present invention relates to MAC headers for efficient data transmissions in a wireless communication system.

First of all, the following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In the description of drawings, procedures or steps, which may ruin the substance of the present invention, are not explained. And, procedures or steps, which can be understood by those skilled in the art, are not explained as well.

In this disclosure, embodiments of the present invention are described centering on the data transmission/reception relations between a base station and a mobile station. In this case, the base station is meaningful as a terminal node of a network which directly performs communication with the mobile station. In this disclosure, a specific operation explained as performed by a base station can be performed by an upper node of the base station in some cases.

In particular, in a network constructed with a plurality of network nodes including a base station, it is apparent that various operations performed for communication with a mobile station can be performed by a base station or other networks except the base station. In this case, 'base station' can be replaced by such a terminology as a fixed station, a Node B, an eNode B (eNB), an advanced base station (ABS), an access point and the like. And, 'mobile station (MS)' can be replaced by such a terminology as a user equipment (UE), a subscriber station (SS), a mobile subscriber station (MSS), an advanced mobile station (AMS), a mobile terminal, a terminal and the like.

Moreover, a transmitting stage means a stationary and/or mobile node that transmits a data service or a speech service. And, a receiving stage means a stationary and/or mobile node that receives a data service or a speech service. Hence, a mobile station can become a transmitting stage and a base station can become a receiving stage, in uplink. Likewise, a mobile station becomes a receiving stage and a base station can become a transmitting stage, in downlink.

In particular, the steps or parts, which are not explained to clearly reveal the technical idea of the present invention, in the embodiments of the present invention can be supported by the above documents. Specifically, embodiments of the present invention can be supported by at least one of P802.16-2004, P802.16e-2005, P802.16e-2009 and P802.16m documents, which are the standards of IEEE 802.16 system.

In the following description, a preferred embodiment of the present invention is explained in detail with reference to the accompanying drawings. Detailed description disclosed together with the accompanying drawings is intended to explain not a unique embodiment of the present invention but an exemplary embodiment of the present invention.

In the following description, specific terminologies used for embodiments of the present invention are provided to help the understanding of the present invention. And, the use of the specific terminology can be modified into another form within the scope of the technical idea of the present invention.

Figure 4:
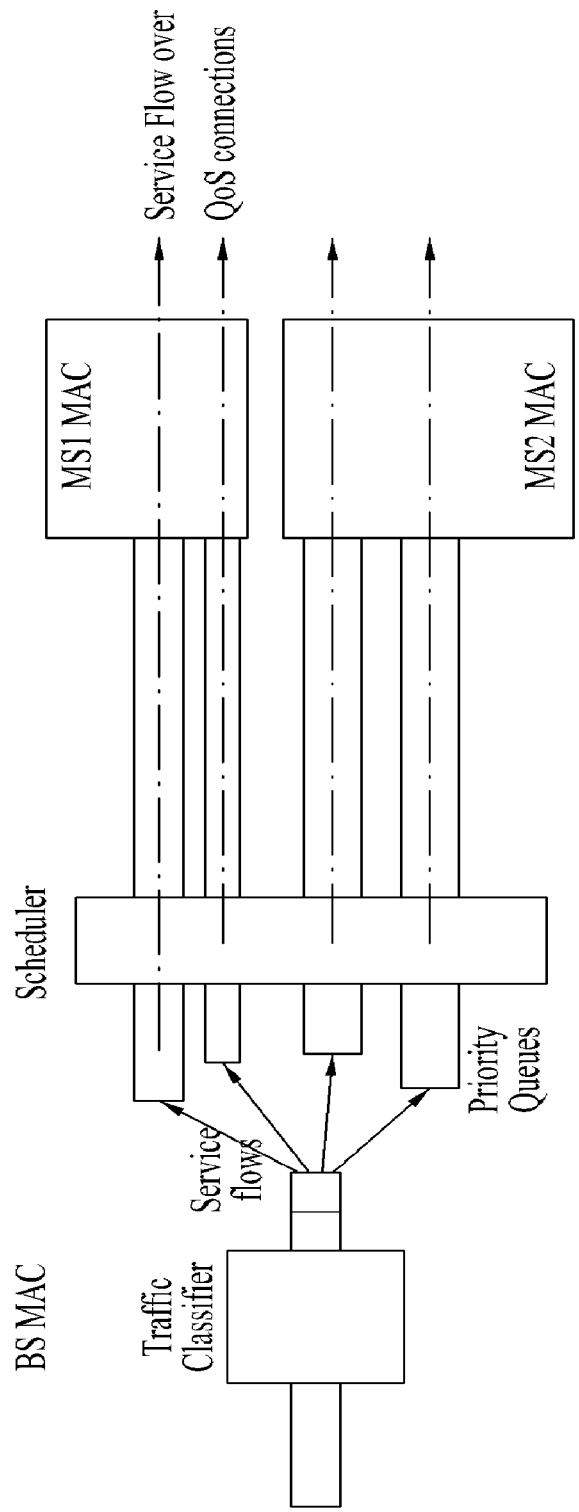
FIG. 4 is a diagram of a connection and service flow (SF) used by an IEEE 802.16 system.

FIG. 4 is a diagram of a connection and service flow (SF) used by an IEEE 802.16 system.

Referring to FIG. 4, in order to provide QoS of an upper service flow (SF), a logical connection of a MAC layer maps an SF to a logical connection for which a QoS parameter is defined. And, the logical connection is defined to provide QoS in a MAC layer through appropriate scheduling for data transmission of the corresponding connection. Types of connections defined in the MAC layer include a management connection allocated per mobile station for mobile station management in the MAC layer and a transport connection mapped to a service flow for upper service data transport.

All user data communications are in the context of transport connections. A transport connection is uni-directional, and identified by a unique flow identifier (FID) which is assigned during a DSA procedure (will be described hereinafter), excluding the transport connections associated with the default service flows. The transport connections for the default service flows in uplink and downlink direction are each identified by the pre-assigned FID and established by the registration procedure during network entry.

Each transport connection is associated with an active or admitted service flow to provide various levels of QoS required by the service flow. The transport connection is established when the associated active service flow is admitted or activated, and released when the associated service flow becomes inactive. Once established, the FID of the transport connection is not changed during wireless MAN-OFDMA advanced system handovers. To reduce bandwidth usage, the AMS and the ABS may establish/change/release multiple connections using a single DSx message transaction on a control connection.

Service flows can be pre-provisioned or dynamically created. Transport connections associated with pre-provisioned service flow are established by the DSA procedure triggered by completion of the MAS network entry. Especially the transport connections associated with the default service flows in uplink and downlink direction each are established with the pre-assigned FIDs by successful registration procedure.

On the other hand, AMS or ABS can create new service flows and their associated transport connections dynamically using DSA procedure if needed. A transport connection is created, changed or deleted when the associated service flow is created, changed or deleted respectively.

Figure 5:
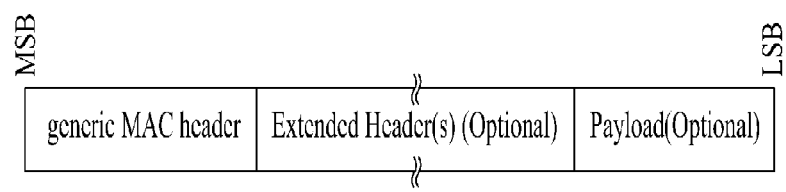
FIG. 5 is a diagram for one example of a MAC PDU (protocol data unit) type defined in a wireless MAN mobile communication system based on IEEE 802.16 system used in general.

FIG. 5 is a diagram for one example of a MAC PDU (protocol data unit) type defined in a wireless MAN mobile communication system based on IEEE 802.16 system used in general.

In general, in a link layer below a second layer (i.e., a link layer or a MAC layer) and a physical layer, a header format of MAC PDU is defined different according to a protocol of such a system as LAN, Wireless LAN, 3GPP, 3GPP2, Wireless MAN and the like. MAC header contains a MAC or link address of a node for inter-node data forwarding in the link layer and is able to contain header error check and link layer control information.

Referring to FIG. 5, each MAC PDU starts with a MAC header of a predetermined length. The MAC header is located ahead of a payload of the MAC PDU. The MAC PDU can include at least one extended header. The extended header is located behind the MAC header. In case that the extended header is included, the payload is located behind the extended header. The payload of the MAC PDU can include a sub-header, a MAC SDU and a fragment. And, a length of payload information is changeable to represent a variable byte size. Accordingly, the MAC sublayer is able to transmit various traffic types of an upper layer without recognizing a format or bit pattern of a message. Besides, a cyclic redundancy check (CRC) for error detection can be included in the MAC PDU [not shown in FIG. 5].

There are MAC headers of three types. In particular, they can be classified into an advanced generic MAC header (AGMH) including a payload behind a header, a short-packet MAC header (SPMH) for supporting such an application as VoIP, and a MAC signaling header for such a control as a bandwidth request and the like. The AGMH having the payload located behind the header is located at a start part of DL/UL MAC PDU including data of a MAC control message and a convergence layer (CS) and is called a generic MAC header (GMH) in IEEE 802.16e and the like.

Table 1 shows one example of an advanced generic MAC header structure used in a wireless communication system based on IEEE 802.16 system.

TABLE 1

| Syntexc | Size (Bit) | Notes |
|---|---|---|
| Advanced Generic MAC header( ){ | | |
| Flow ID | 4 | Flow Identifier |
| EH | 1 | Extended header presence indicator; When set to '1', this field indicates that an Extended Header is present following this GMH. |
| Length | 11 | This field indicates the length in bytes of MAC PDU including the GMH and extended header if present. |
| } | | |

Referring to Table 1, an advanced generic MAC header includes a flow identifier field (Flow ID) having a flow identifier for identifying a service flow carrying MAC PDU using the corresponding advanced generic MAC header from other service flows, an extended header presence indicator field (EH presence indicator) indicating whether an extended header of the corresponding MAC PDU is present, and a length field (Length) including length information of the corresponding MAC PDU.

When 1 bit is allocated to the extended header presence indicator field, if the corresponding field is set to 1, this field indicates that the extended header is present. If the corresponding field is set to 0, this field indicates that the extended header is not present. The length field (Length) indicates length information of the MAC PDU including the extended header if the extended header is present. The length field is represented in bytes. And, 11 bits are allocated to the length field.

The short-packet MAC header (SPMH) is generated to have a size equal to or smaller than a predetermined size with predetermined periodicity like VoIP. And, the SPMH is usable if an application, to which ARQ (automatic retransmission request) is not applied, is supported.

Table 2 shows one example of a format of a SPMH used in a wireless communication system based on IEEE 802.16 system.

TABLE 2

| Syntax | Size (bits) | Notes |
|---|---|---|
| Short-Packet MAC header( ){ | | |
| EH | 1 | Extended header presence indicator; When set to '1', this field indicates that an Extended Header is present following this SPMH. |
| Length | 7 | This field indicates the length in bytes of MAC PDU including the SPMH and extended header if present. |
| } | | |

Referring to Table 2, a SPMH includes an extended header presence indication field indicating whether an extended header is present and a length field indicating a length of MAC PDU including a SPMH.

Since the SPMH is a header that is used at a resource allocated location, which was already negotiated between a base station and a mobile station, for such resource allocation as persistent resource allocation and group resource allocation, a receiving side is able to identify the SPMH at the corresponding location despite that a flow identifier is not included. Unlike the advanced generic MAC header, the SPMH does not include a field (Flow ID) including a flow identifier.

Since the persistent resource allocation or the group resource allocation is used as a resource allocation scheme for such a periodic and short packet as VoIP, a length of the SPMH can be implemented within a 7-bit range according to a VoIP packet size. Therefore, the compact MAC head, as exemplarily shown in Table 2, can have a size of 1 byte by allocating 1 bit and 7 bits to the extended header presence indicator field and the length field, respectively.

Meanwhile, a MAC PDU can be accompanied by at least one extended header according to property of information to be carried on the corresponding MAC PDU, a transmission scheme applied to the corresponding MAC PDU, or the like. The extended header is inserted right behind the MAC header. In case that a corresponding MAC PDU includes a payload, an extended header is inserted in front of the payload.

The extended header is a subheader inserted behind a MAC header in MAC PDU. Using an extended header presence indicator field of an advanced generic MAC header or a SPMH, a receiving side can be informed whether the header is included in the MAC PDU. Yet, a MAC signaling header is not companied by an extended header.

Table 3 shows one example of a generic extended header used in a wireless communication system based on IEEE 802.16 system.

TABLE 3

| Syntax | Size (bits) | Notes |
|---|---|---|
| Extended Header( ){ | | |
| LAST | 1 | Last Extended Header indicator: 0 = one or more extended header follows the current extended header unless specified otherwise; 1 = this extended header is the last extended header unless specified otherwise |
| Type | TBD | Type of extended header |
| Body Contents | Variable | Type dependent content |
| } | | |

Referring to Table 3, an extended header includes an extended header presence indicator field (LAST) indicating whether at least one or more other extended headers are present behind the corresponding extended header, an extended header type field (Type) indicating a type of the corresponding extended header and an extended header body field (Body Contents) including at least one field having informations relevant to the extended header indicated by the extended header type field.

When 1 bit is allocated to the extended header indicator field (LAST), for example, if the corresponding field is set to 0, it indicates that the at least one or more other extended headers are present behind the current extended header. If the corresponding field is set to 1, it is able to indicate that the current extended header is the extended header included last in the corresponding MAC PDU.

In the extended header body field (Body Contents), the included information and a length of the body field are determined according to an extended header type indicated by the extended header type field (Type).

The extended header types are described with reference to Table 4 as follows.

Table 4 shows types of a generic extended header used in a wireless communication system based on IEEE 802.16 system.

TABLE 4

| Extended Header Type | Notes |
|---|---|
| Fragmentation and Packing Extended Header | This extended header is used in applying fragmentation, packing or sequence number to MAC PDU accompanied by a payload for a single transport connection. |
| MAC Control Extended Header | This extended header is used when MAC PDU includes a payload for a control connection. |
| Multiplexing Extended Header | This extended header is used when a payload for multiplexing association related to the same SA (security association) multiplexed in the same MAC PDU is included. |
| Message ACK Extended Header | This extended header is used for a base station or a mobile station to indicate acknowledgement of a MAC control message. |

TABLE 4-continued

| Extended Header Type | Notes |
|---|---|
| Sleep Control Extended Header | This extended header is used for a base station or a mobile station to deliver control signaling related to a sleep cycle operation. |
| Correlation Matrix Feedback Extended Header | This extended header is used by a mobile station in response to feedback polling A-MAP IE for requesting a quantized transport correlation matrix when a base station uses 2 or 4 transmitting antennas. |
| MIMO Feedback Extended Header | This extended header is used by a mobile station in response to feedback polling A-MAP IE fore requesting a feedback of broadband or subband information. |
| Piggybacked Bandwidth Request Extended Header | This extended header is used when a mobile station requests a piggybacked bandwidth for at least one flow. |
| MAC PDU Length Extended Header | This extended header is added to a corresponding MAC PDU if a MAC PDU length is equal to or greater than 2,047 bytes. |
| ARQ Feedback Extended Header | This extended header is used when an ARQ receiving part transmits feedback information. |

Regarding a plurality of the extended headers described with reference to Table 4, if a MAC PDU accompanied by a payload for a single transport connection is going to be fragmented, packed or ARQ-applied, FPEH is present at the corresponding MAC PDU. In doing so, an advanced generic MAC header is used as a MAC header. Although fragmentation, packing, ARQ or the like is not applied, in that HARQ re-ordering is applied to such a small data packet as VoIP, MAC PDU can be accompanied by FPEH to include sequence number information on a packet to retransmit. In this case, a SPMH is used as a MAC header.

Table 5 shows one example of a fragmentation & packing extended header (FPEH) format used in a wireless communication system based on IEEE 802.16 system. And, fields included this format are described with reference to Table 5 as follows.

TABLE 5

| Syntex | Size (Bits) | Notes |
|---|---|---|
| FPEH( ){ | | |
| RI (Rearrangement header Indicator) | 1 | This field includes ARQ rearrangement indicator.-'0' bit setting - Not indicate ARQ rearrangement-'1' bit setting - Indicate ARQ rearrangement |
| SN (Sequence Number) | 10 | 'SN' is maintained by connection unit.-Regarding non-ARQ connection, 'SN' indicates a sequence number of MAC PDU containing a payload and a value of the SN is incremented per MAC PDU by 1.-Regarding ARQ connection, 'SN' indicates an ARQ block sequence number. |
| FC (Fragment Control) | 2 | This field includes information on fragmentation control |
| AFI(ARQ Feedback IE) | 1 | This field includes ARQ feedback information element (IE) indicator.-'0' bit setting: ARQ feedback IE is not included in MAC PDU-'1' bit setting: ARQ feedback IE is present behind FPEH |
| AFP(ARQ Feedback Poll) | 1 | This field includes ARQ feedback poll indicator.-'0' bit setting: ARQ feedback poll is not included-'1' bit setting: ARQ feedback poll relevant to a connection indicated by a generic MAC header (GMH) is included |
| If (RI==1){ | | |
| LSI (Last ARQ Subblock Indicator) | 1 | Last ARQ subblock indicator-'0' bit setting: Last subblock in single ARQ block not included in a corresponding MAC PDU is indicated-'1' bit setting: Single ARQ block included in a corresponding MAC PDU |
| SSN (Sub-SN) | TBD | Sub-sequence number of 1st ARQ subblock |
| } | | |
| Do{ | | |
| End | 1 | Indication of more information-'0' bit setting: 'Length' field and other 'End' field are further included-'1' bit setting: 'Length' field and other 'End' field are not further included |
| If (End=0) { | | |
| Length | 11 | This field indicates the length of SDU or SDU fragment |
| } | | |
| } | | |
| }while (!End) | | |
| Reserved | Varible | |
| } | | |

Referring to Table 5, a sequence number field (SN) included in FPEH indicates a sequence number of MAC PDU accompanied by a payload in case that the FPEH is not used for ARQ connection. The sequence number field (SN) is incremented by 1 for each MAC PDU. In case that the FPEH is used for the ARQ connection, the sequence number field is set to a prescribed value that indicates a sequence number of an ARQ block.

If the rearrangement header identifier field (RI) in the FPEH is set to 0 and the end field (End) indicating whether more information is included is set to 0, the fragmentation & packing extended header has a length of at least 2 bytes. In case of attempting to transmit data, the FPEH can present at a MAC PDU including a generic MAC header and a SPMH for HARQ reordering of VoIP packet.

In this case, SDU including a SPMH is used for such a periodically transmitted small packet as VoIP packet and the like. In this case, fragmentation, packing ARQ or the like is not performed on such a packet as VoIP and the FPEH uses the SN field only for HARQ reordering. Since the VoIP packet is generated to have a size smaller than that of other data with a prescribed periodicity, it is not necessary to allocate a considerable bit size to the SN field. Even if the FPEH of a minimum size (e.g., 2 bytes) is added to a VoIP packet including a SPMH, a size of the header becomes 3 bytes to result in unnecessary resource waste in VoIP packet transmission.

As mentioned in the foregoing description, a SPMH is used at a resource allocated location previously negotiated between a base station and a mobile station and does not include a field Flow ID to reduce a transmission overhead. Occasionally, when a base station or a mobile station receives a MAC PDU including a SPMH, it is necessary to perform a flow mapping process. For instance, in case of using a multiple persistent allocation (PA) or a group resource allocation, a base/mobile station should perform mapping on a corresponding flow in each resource allocation to be aware that each resource allocation is mapped to which service. In case of receiving a SPMH not including the field Flow ID at each corresponding location, the base/mobile station should perform a flow mapping process to increase a processing overhead.

Therefore, the present invention intends to propose a method of transmitting a signal using an efficient SPMH structure or format usable in transmitting such a small packet transmitted with a prescribed periodicity as a VoIP packet. And, the present invention also intends to propose a method of providing a service through a step of negotiating a MAC header type between a base station and a mobile station.

Figure 6:
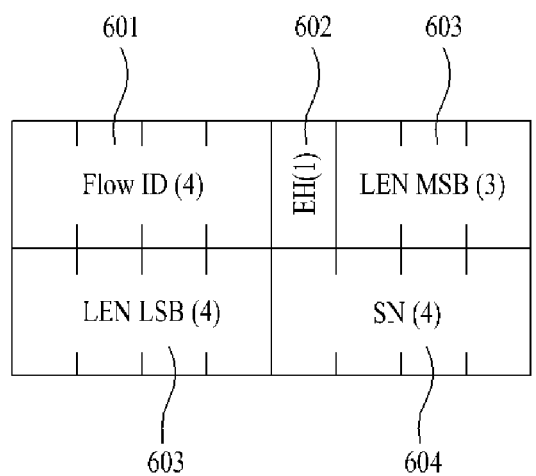
FIG. 6 is a diagram for one example of a short-packet MAC header format according to one embodiment of the present invention.

FIG. 6 is a diagram for one example of a SPMH structure according to one embodiment of the present invention.

In the following disclosure including FIG. 6, a single scale mark of a block representing a MAC PDU structure indicates 1 bit and a horizontal row indicates 1 byte. Moreover, bits are arranged downward in order from a most significant bit (MSB) to a least significant bit.

The SPMH is defined to support application, such as VoIP, which uses small data packets and non ARG connection. Extended header group may be piggybacked on the SPMH, if allowed by its length field. With the exception of extended header group, the SPMH shall not require any other headers. The SPMH is indentified by the specific FID (Flow ID) that is provisioned statically, or created dynamically via AAI_DSA-REQ/RSP.

Referring to FIG. 6, a SPMH according to one embodiment of the present invention includes a flow identifier field (Flow ID) 601 having an identifier of a service flow, an extended header group presence indicator field (EH) 602 indicating whether an extended header group including at least one extended header is present behind the SPMH, a length field (Length) 603 having length information of a corresponding MAC PDU, and a sequence number field (SN) 604 indicating a sequence number of the MAC PDU. The respective fields are schematically described with reference to Table 6 as follows.

Table 6 shows one example of a SPMH format according to one embodiment of the present invention.

TABLE 6

| Syntex | Size (Bits) | Notes |
| --- | --- | --- |
| Short-Packet MAC header( ){ | | |
| Flow ID | 4 | Flow Identifier |
| EH | 1 | Extended Header presence Indicator |
| Length | 7 | This field indicates the length in bytes of MAC PDU including the SPMH and the extended header if present. |
| SN (Sequence Number) | 4 | This field includes a MAC PDU payload sequence number incremented by one for each MAC PDU (modulo 16). |
| } | | |

Referring to FIG. 6 and Table 6, a SPMH according to one embodiment of the present invention includes a 4-bit flow identifier field (Flow ID), a 1-bit extended header group presence indicator field (EH), a 7-bit length field (Length) capable of supporting 127-byte MAC PDU, and a 4-bit sequence number field (SN). In this case, a size of the SPMH can be implemented with 2 bytes.

The flow identifier field 601 includes identification information of a service flow used by the corresponding SPMH.

The sequence number field 604 includes sequence number information corresponding to a payload of a corresponding MAC PDU. In particular, since the SPMH is used in transmitting such a small packet generated with prescribed periodicity as VoIP packet, it is able to apply HARQ to an error check instead of applying ARQ thereto. Therefore, unlike the sequence number field included in the above FPEH described with reference to Table 5, the sequence number field of the SPMH includes a sequence number of the MAC PDU accompanied by the payload in case of not applying the ARQ. In this case, the bit value, to which the sequence number field is set, is incremented by 1 for each MAC PDU.

The SPMH is used for HARQ reordering. If a maximum HARQ retransmission count in the IEEE 802.16m system is basically 4 and a maximum interval between retransmitted HARQs is 2 frames, a maximum time taken for the HARQ retransmissions is 8 frames in general. Assuming that the generation periodicity of VoIP packet is minimum 2 frames, when a 4-bit sequence number is used, it is less probable that the HARQ retransmission is not completed within 32 frames.

Therefore, a SPMH according to one embodiment of the present invention is able to simplify a size of the SPMH including a sequence number field by small bit allocation in a manner of allocating 4 bits to the sequence number field rather than allocating 10 bits to a sequence number field of FPEH.

Figure 7:
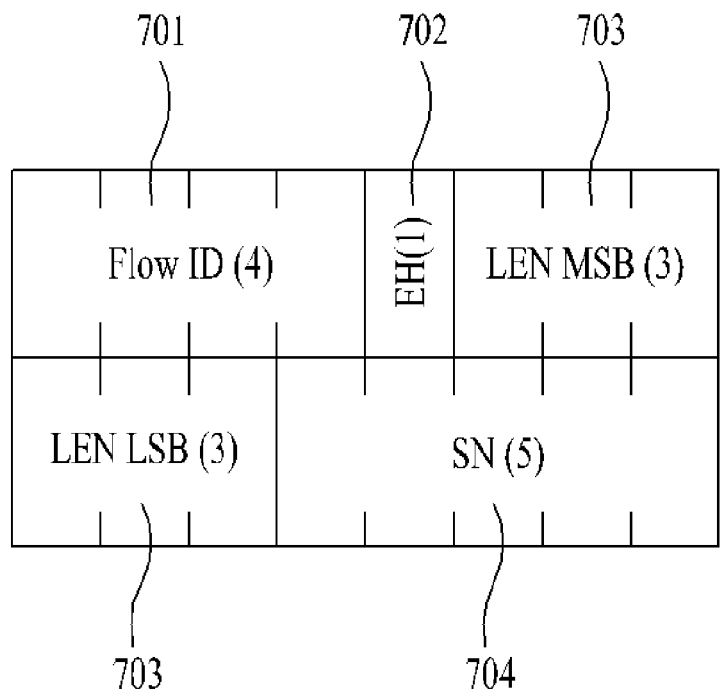
FIG. 7 is a diagram for another example of a compact MAC header format according to one embodiment of the present invention.

Even if HARQ is applied to a corresponding MAC PDU, a SPMH according to one embodiment of the present invention may not be accompanied by FPEH. Therefore, it is able to reduce a size of over head of a MAC header into minimum 2 bytes, as shown in FIG. 7. In this case, it is able to use the extended header presence indicator field 602 to indicate that an extended header is not present.

FIG. 7 is a diagram for another example of a SPMH format according to one embodiment of the present invention.

Referring to FIG. 7, types of fields constructing a SPMH according to one embodiment of the present invention are the same as described with reference to FIG. 6 except the following. In particular, 6 bits are allocated to a length field 703 to a length field 703 to support MAC PDU up to 63 bytes and 5 bits can be allocated to a sequence number field 704. As a 5-bit sequence number is used, it is able to cover 32 packets in case of HARQ retransmission.

Meanwhile, unlike the SPMHs shown in FIG. 6 and FIG. 7, it is able to put limitation on a use of a piggyback bandwidth request extended header (hereinafter abbreviated PBREH). In this case, the piggyback bandwidth request extended header is the extended header present at a MAC PDU when a mobile station makes a piggybacked bandwidth request for at least one flow. Examples of a SPMH for putting limitation of a use of a piggybacked bandwidth request extended header are described with reference to FIGS. 8 to 13 as follows.

FIGS. 8 to 11 are diagrams of other examples of a SPMH format according to one embodiment of the present invention.

Referring to FIGS. 8 to 11, a SPMH according to one embodiment of the present invention includes a flow identifier field (Flow ID: 801, 901, 1001, 1101) having a flow identifier for identifying a service flow carrying a corresponding MAC PDU including the SPMH, a length field (Length: 802, 902, 1002, 1102) including length information of the corresponding MAC PDU including the SPMH, and a sequence number field (SN: 803, 903, 1003, 1103) including a sequence number of a payload included in the corresponding MAC PDU only. In particular, the SPMH can be configured in a manner of adjusting the number of bits allocated to other fields instead of including an extended header presence indicator field (EH presence indicator) indicating a presence or non-presence of an extended header or can include a reserved region (Reserved: 1004, 1104).

In this case, it is able to maintain 4 bits allocated to a flow identifier field (Flow ID) in the SPMH format according to one of the embodiments of the present invention shown in FIGS. 8 to 11.

Figure 8:
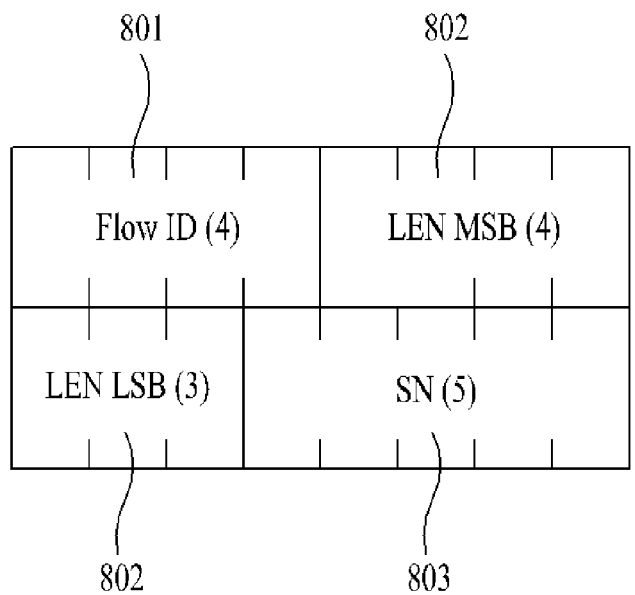
FIGS. 8 to 13 are diagrams of other examples of a short-packet MAC header format according to one embodiment of the present invention.
Figure 9:
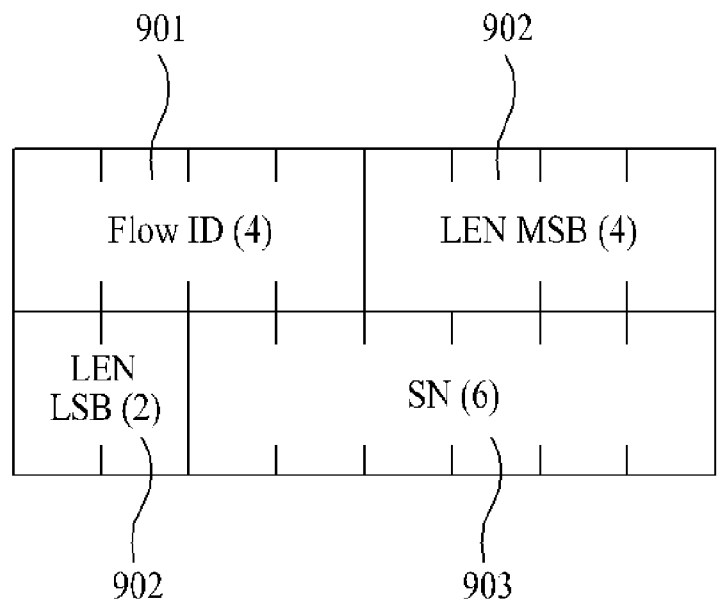
Figure 10:
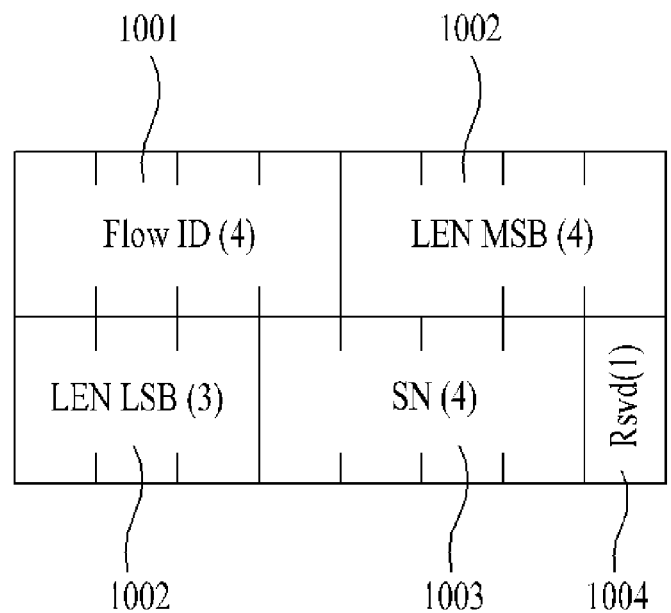
Figure 11:
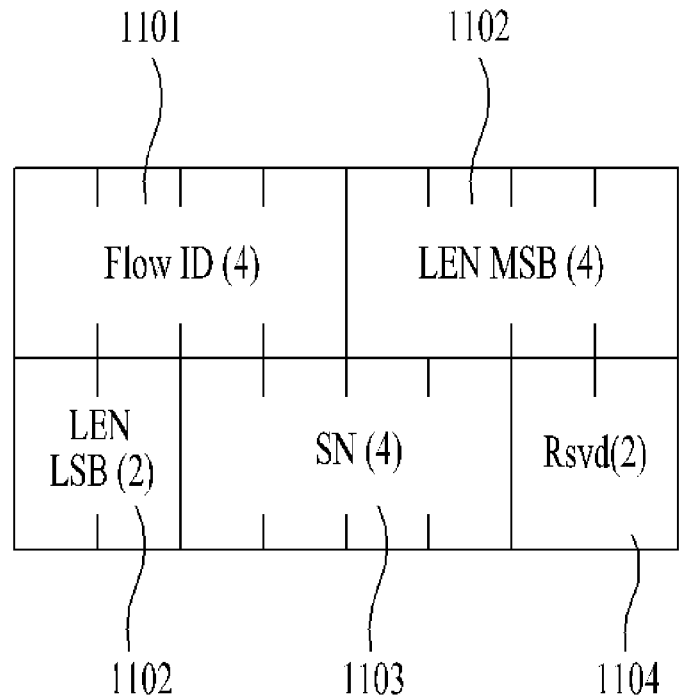

For one example, a SPMH failing to include an extended header, as shown in FIG. 8, can include a 7-bit length field 802 and a 5-bit sequence number field 803. For another example, a SPMH, as shown in FIG. 9, can include a 6-bit length field 902 and a 6-bit sequence number field 903. For another example, a SPMH, as shown in FIG. 10, can include a 7-bit length field 1002, a 4-bit sequence number field 1003 and a 1-bit reserved region 1004. For a further example, a SPMH, as shown in FIG. 11, can include a 6-bit length field 1102, a 4-bit sequence number field 1103 and a 2-bit reserved region 1104.

Unlike the above examples of the SPMH according to one embodiment of the present invention, it is able to configure a SPMH that uses a flow index instead of a flow identifier.

Figure 12:
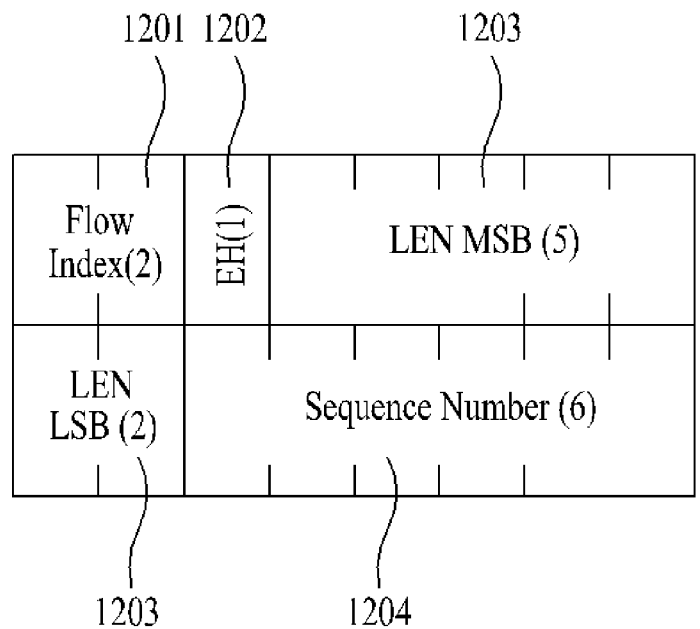

FIG. 12 is a diagram for a further example of a SPMH according to one embodiment of the present invention.

Referring to FIG. 12, a SPMH according to one embodiment of the present invention can include a flow index field (Flow Index) 1201 including index information of a flow, an extended header presence indicator field (EH) 1202 indicating whether an extended header is further present at a corresponding MAC PDU, a length field (Length) 1203 including length information of the corresponding MAC PDU, and a sequence number field (SN) 1204 including a sequence number of a payload included in the corresponding MAC PDU. In this case, the flow index is the information for specifying a flow allocated to a mobile station by a base station. And, each flow index is mapped to a corresponding flow identifier. The flow index is the information of which size is smaller than that of the flow identifier. And, 2 bits can be allocated to the flow index field 1201. Thus, as the number of bits allocated to the flow index is decremented by 2, the number of bits allocated to the sequence number field 1204 can be incremented into 6 bits and 64 packets can be covered in case of HARQ retransmission. Since a 2-bit flow index is used, the number of flows or flow identifiers capable of using a SPMH in one mobile station becomes maximum 4.

As mentioned in the above description, in case of using a flow index, a separate field for indicating whether a MAC header type used by a corresponding resource is a generic MAC header or a SPMH can be added to a map for persistent resource allocation (e.g., UL/DL individual persistent A-MAP IE, UL/DL composite persistent A-MAP IE, group configuration A-MAP IE, etc.). Alternatively, when a corresponding mobile station is added to a specific group for group resource allocation, it is able to add a MAC header type field to a group configuration message (UL/DL group configuration A-MAP IE) or the like.

Format of a SPMH including a flow index field is provided to describe a SPMH according to the present invention. Likewise, the format of the SPMH can be configured in a manner of including or not including a field (EH) indicating a presence or non-presence of an extended header.

Table 7 shows examples of a SPMH format according to one embodiment of the present invention. In particular, Table 7 shows examples of a 2-byte SPMH format including one of variously configured flow index fields.

TABLE 7

| Flow Index Bits | EH Field | SPMH (2 bytes) |
|---|---|---|
| 1 | Presence | 1. Flow Index(1) + EH(1) + Length(7) + SN(7) 2. Flow Index(1) + EH(1) + Length(7) + SN(6) + Reserved(1) 3. Flow Index(1) + EH(1) + Length(7) + SN(5) + Reserved(2) 4. Flow Index(1) + EH(1) + Length(7) + SN(4) + Reserved(3) 5. Flow Index(1) + EH(1) + Length(6) + SN(8) 6. Flow Index(1) + EH(1) + Length(6) + SN(7) + Reserved(1) 7. Flow Index(1) + EH(1) + Length(6) + SN(6) + Reserved(2) 8. Flow Index(1) + EH(1) + Length(6) + SN(5) + Reserved(3) 9. Flow Index(1) + EH(1) + Length(6) + SN(4) + Reserved(4) |
| 1 | Non-presence | 1. Flow Index(1) + Length(7) + SN(8) 2. Flow Index(1) + Length(7) + SN(7) + Reserved(1) 3. Flow Index(1) + Length(7) + SN(6) + Reserved(2) 4. Flow Index(1) + Length(7) + SN(5) + Reserved(3) 5. Flow Index(1) + Length(7) + SN(4) + Reserved(4) 6. Flow Index(1) + Length(6) + SN(9) 7. Flow |

TABLE 7-continued

| Flow Index Bits | EH Field | SPMH (2 bytes) |
|---|---|---|
| | | Index(1) + Length(6) + SN(8) 8. Flow Index(1) + Length(6) + SN(7) + Reserved(2) 9. Flow Index(1) + Length(6) + SN(6) + Reserved(3) 10. Flow Index(1) + Length(6) + SN(5) + Reserved(4) 11. Flow Index(1) + Length(6) + SN(4) + Reserved(5) |
| 2 | Presence | 1. Flow Index(2) + EH(1) + Length(7) + SN(6) 2. Flow Index(2) + EH(1) + Length(7) + SN(5) + Reserved(1) 3. Flow Index(2) + EH(1) + Length(7) + SN(4) + Reserved(2) 4. Flow Index(2) + EH(1) + Length(6) + SN(7) 5. Flow Index(2) + EH(1) + Length(6) + SN(6) + Reserved(1) 6. Flow Index(2) + EH(1) + Length(6) + SN(5) + Reserved(2) 7. Flow Index(2) + EH(1) + Length(6) + SN(4) + Reserved(3) |
| 2 | non-Presence | 1. Flow Index(2) + Length(7) + SN(7) 2. Flow Index(2) + Length(7) + SN(6) + Reserved(1) 3. Flow Index(2) + Length(7) + SN(5) + Reserved(2) 4. Flow Index(2) + Length(7) + SN(4) + Reserved(3) 5. Flow Index(2) + Length(6) + SN(8) 6. Flow Index(2) + Length(6) + SN(7) + Reserved(1) 7. Flow Index(2) + Length(6) + SN(6) + Reserved(2) 8. Flow Index(2) + Length(6) + SN(5) + Reserved(3) 9. Flow Index(2) + Length(6) + SN(4) + Reserved(4) |
| 3 | Presence | 1. Flow Index(3) + EH(1) + Length(7) + SN(5) 2. Flow Index(3) + EH(1) + Length(7) + SN(4) + Reserved(1) 3. Flow Index(3) + EH(1) + Length(6) + SN(6) 4. Flow Index(3) + EH(1) + Length(6) + SN(5) + Reserved(1) 5. Flow Index(3) + EH(1) + Length(6) + SN(4) + Reserved(2) |
| 3 | Non-Presence | 1. Flow Index(3) + Length(7) + SN(6) 2. Flow Index(3) + Length(7) + SN(5) + Reserved(1) 3. Flow Index(3) + Length(7) + SN(4) + Reserved(2) 4. Flow Index(3) + Length(6) + SN(7) 5. Flow Index(3) + Length(6) + SN(6) + Reserved(1) 6. Flow Index(3) + Length(6) + SN(5) + Reserved(2) 7. Flow Index(3) + Length(6) + SN(4) + Reserved(3) |

Referring to Table 7, it is able to allocate 1 bit or 3 bits to a flow index field. If 1 bit is allocated to a flow index field, the number of flows or flow IDs capable of using a SPMH in one mobile station becomes maximum 3. If 3 bits are allocated to a flow index field, the number of flow extended EHs or flow IDs usable in one mobile station becomes maximum 8.

Figure 13:
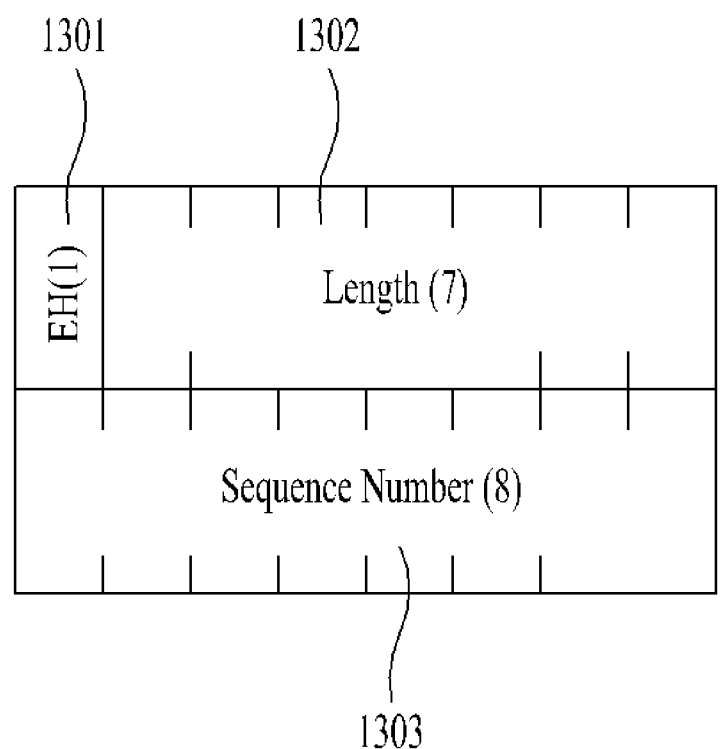

FIG. 13 is a diagram for another further example of a SPMH according to one embodiment of the present invention.

Referring to FIG. 13, a SPMH according to one embodiment of the present invention can include an extended header presence indicator field (EH) 1301, a length field (Length) 1302 including length information of a corresponding MAC PDU, and a sequence number field (SN) 1303 including a sequence number of a payload included in the corresponding MAC PDU.

In particular, according to a 1-byte SPMH format defined by IEEE 802.16 system, an 8-bit sequence number field 1303 is added instead of configuring a field including a flow identifier. A size of the SPMH shown in FIG. 13 is set to 2 bytes and may not be further accompanied by a fragmentation & packing extended header for HARQ re-transmission.

In case of using one of SPMHs according to embodiments of the present invention, when HARQ reordering is applied to such a small fixed packet generated each periodicity as VoIP, it is able to transmit a necessary sequence number via a sequence number field within a SPMH. Therefore, it is able to reduce a MAC header overhead without a separate FPEH. According to the above described examples of one embodiment of the present invention, a SPMH including a sequence number field can be implemented in one of various formats within a prescribed length such as 2 bytes and the like.

Thus, an available MAC header type is determined according to a packet type or a transmission scheme. And, a procedure for negotiating the determined MAC header type can be performed in the course of a service connection. In particular, in case that a MAC PDU is transmitted using a SPMH according to one embodiment of the present invention or the advanced generic MAC header described with reference to Table 1, a base station and a mobile station is able to preferentially perform negotiation about a of a MAC header type prior to MAC PDU transmission.

In particular, according to another embodiment of the present invention, a base station and a mobile station is able to previously negotiate to use either an advanced generic MAC header or a SPMH according to a type or property of a packet to transmit, information to transmit and a transmission scheme used for packet transmission. This negotiation procedure can be performed via a MAC control message between a base station and a mobile station. In this case, MAC control messages available for the negotiation procedure include a dynamic service addition request/response message (Advanced Air Interface_Dynamic Service Addition-Request/Response: AAI_DSA-REQ/RSP), an advanced air interface dynamic service change request/response message (Advanced Air Interface_Dynamic Service Change-Request/Response: AAI_DSC-REQ/RSP) and the like for example In the following description, another embodiment of the present invention is explained on the assumption that information on a MAC header type is shared using a dynamic service addition request/response message between a base station and a mobile station.

Figure 14:
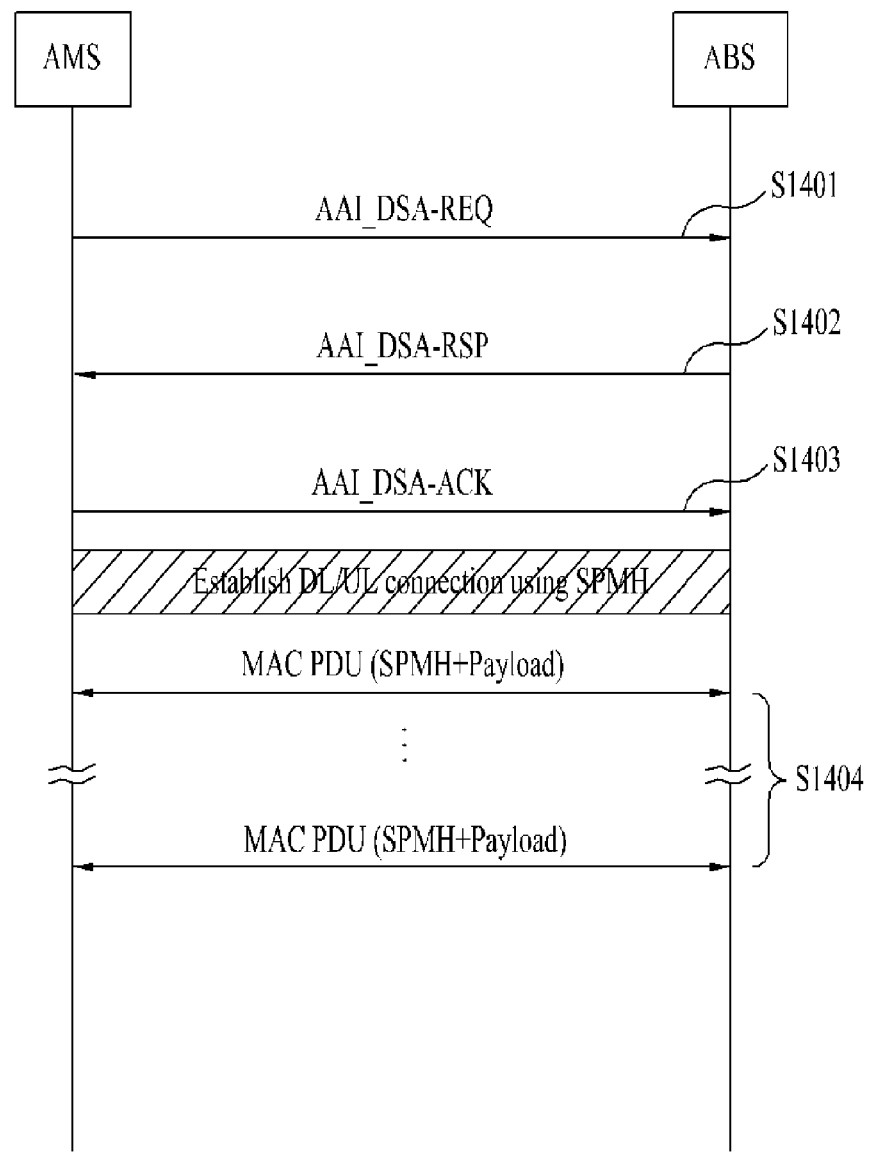
FIG. 14 is a diagram for one example of a process for a mobile station to perform a service connection for MAC PDU transmission to a base station according to another embodiment of the present invention.

FIG. 14 is a diagram for one example of a process for a mobile station to perform a service connection for MAC PDU transmission to a base station according to another embodiment of the present invention.

Referring to FIG. 14, an advanced mobile station (AMS) attempting to create a new service flow sends AAI_DSA-REQ to a advanced base station (ABS) [S1401].

In addition, at the step S1401, when the ABS attempts to create the new service flow, the AAI_DSA-REQ message may be transmitted from the ABS to the AMS.

In this case, the AAI_DSA-REQ message sent to request the dynamic service flow generation can include parameters shown in Table 8 for example.

TABLE 8

| Parameters in AAI_DSA-REQ | Notes |
|---|---|
| Control Message Type | Type information of AAI_DSA-REQ message |
| Service Flow parameters | Service flow parameters for specifying traffic properties and scheduling requirements of service flow (cf. Table 8) |
| CS parameter encodings | This field includes a parameter specified to a convergence sublayer in a corresponding service flow. |
| SCID | Sleep cycle setting change (included in AAI_DSA-REQ sent by a base station or AAI_DSA-RSP sent by a base station in response to a request made by a mobile station) |
| Predefined BR Index | Index information used for a preset bandwidth request procedure (included in AAI_DSA-REQ sent by a base station or AAI_DSA-RSP sent by a base station in response to a request made by a mobile station) |
| E-MBS service | Parameter for requesting a presence or non-presence of a multicast/broadcast service (yet, this field is included in AAI_DSA-REQ sent by a mobile station only) |

Referring to Table 8, various parameters for a dynamic service addition request are included in AAI_DSA-REQ message. And, MAC header type information related to one embodiment of the present invention can be included in a service flow parameter among the various parameters.

Table 9 shows various parameters included in service flow parameters. Yet, Table 9 specifically shows parameters related to the present invention among various service flow parameters only. And, a service addition request/response messages can further include various service flow parameters omitted from Table 8.

TABLE 9

| Field | Size (Bits) | Description |
|---|---|---|
| Flow ID | 4 | Service flow ID information |
| UL/DL Indicator | 1 | This field includes an indicator indicating whether a link related to corresponding parameters is uplink or downlink |
| ... | ... | ... |
| MAC Header Type | 1 | This field includes an indicator indicating a MAC header type included in MAC PDU of a corresponding service flow. |

Referring to Table 9, a service flow parameter can include an identifier (Flow ID) for a service flow to be used in the future, an uplink/downlink indicator (UL/DL Indicator) indicating that a corresponding service flow is used in either uplink or downlink, information (MAC Header Type) on a MAC header type used by MAC PDU of a corresponding service flow and the like.

The flow identifier (FID) specifies a service flow allocated by a base station. Also, the SPMH is identified by the FID that is provisioned statically or created dynamically via the AAI_DSA-REQ/RSP messages. In case that the ABS sends AAI_DSA-REQ message, a flow identifier can be included in the AAI_DSA-REQ message. In case that the AMS sends AAI_DSA-REQ message, as shown in FIG. 7, a flow identifier can be included in AAI_DSA-RSP message sent by a base station in response to the AAI_DSA-REQ message.

A MAC header type parameter indicates which one of an advanced generic MAC header and a SPMH is used for a corresponding MAC PDU in an added service flow in case of MAC PDU transmission. For instance, when 1 bit is allocated to a field (MAC Header Type) including a parameter about a MAC header type, if the field is set to 0, it indicates that an advanced generic MAC header is used. If the field is set to 1, it indicates that a SPMH is used. Yet, the meaning indicated according to the bit setting at the corresponding field is just one example for describing the present invention. Regarding the type information according to the bit value setting corresponding to the MAC header type field, the meanings indicated by the '0' and '1' bit settings can be switched to each other.

Referring now to FIG. 14, the AMS is able to send AAI_DSA-REQ message including a parameter (MAC Header Type=1) about a MAC header type for specifying a use of a SPMH to the ABS in order to transmit such a small packet generated with prescribed periodicity as VoIP. In this case, the AAI_DSA-REQ message can further include a link indication parameter (UL) indicating an uplink in the UL/DL indicator field in order to represent a dynamic service flow generation request in uplink.

Having received the AAI_DSA-REQ message, the ABS sends AAI_DSA-RSP to the AMS in response to the received AAI_DSA-REQ message [S1402].

At the step S1402, if the AAI_DSA-REQ message is transmitted from the ABS, the AAI_DSA-RSP message is transmitted from the AMS to the ABS.

In particular, parameters included in the AAI_DSA-RSP message are described with reference to Table 10 as follows.

TABLE 10

| Parameters in AAI_DSA-RSP | Notes |
|---|---|
| Control Message Type | Type information of AAI_DSA-RSP message |
| Confirmation Code(CC) | Confirmation code for corresponding AAI_DSA-REQ |
| Service Flow parameters | Service flow parameters for specifying traffic properties and scheduling requirements of service flow (cf. Table 8) |
| CS parameter encodings | This field includes a parameter specified to a convergence sublayer in a corresponding service flow. |
| SCID | Sleep cycle setting change (included in AAI_DSA-REQ sent by a base station or AAI_DSA-RSP sent by a base station in response to a request made by a mobile station) |
| Predefined BR Index | Index information used for a preset bandwidth request procedure (included in AAI_DSA-REQ sent by a base station or AAI_DSA-RSP sent by a base station in response to a request made by a mobile station) |
| FID(Flow ID) | This field indicates Flow ID information on a transport connection included if a service flow is successfully added. |
| QoS parameters | QoS parameter relevant to service classification |
| E-MBS service/E-MBS Zone ID/E-MBS service Flow parameters | This field indicates ID information of E-MBS zone and service flow parameter about E-MBS if E-MBS is supported. |

Referring to Table 10, AAI_DSA-RSP message includes prescribed parameters. In addition, a type of each of the included parameters is determined according to a transmitting subject. AAI_DSA-RSP type information, a confirmation code for AAI_DSA-REQ message, a service flow parameter and a parameter specified to a CS in a corresponding service flow are included in the AAI_DSA-RSP massage sent by a base station or a mobile station.

According to the sent AAI_DSA-REQ message, in case that a service flow generation is successfully performed, parameters relevant to SCID, Predefined BR index, FID, E-MBS service and the like can be further included.

The service flow parameter is further included in the AAI_DSA-RSP message as well. Since the AAI_DSA-RSP message includes the same information described with reference to Table 8, the redundant description shall be omitted from the following description. Yet, regarding information on a MAC header type, a MAC header type parameter identical to that included in the AAI_DSA-REQ or MAC header type information arbitrarily determined by the ABS can be included in the AAI_DSA-RSP message sent by the ABS in response to a request made by the AMS. In case that the AMS sends AAI_DSA-RSP message in response to the AAI_DSA-REQ message sent by the ABS, the same MAC header type parameter included in the AAI_DSA-REQ message is included in the AAI_DSA-RSP message.

In FIG. 14, since the ABS sends the MAC header type parameter indicating the use of the SPMH via the AAI_DSA-RSP message in the step S1402, it can be regarded as performing the negotiation on the SPMH use between the ABS and the AMS.

Having received the AAI_DSA-RSP message, the mobile station sends AAI_DSA-ACK message indicating acknowledgement of the response message to the ABS [S1403]. Thus, the service generation request procedure is completed to use the SPMH in uplink and an uplink service connection is established.

Afterwards, the AMS and the ABS are able to configure the SPMH and the MAC PDUs. In addition, the AMS and the ABS may transmit or receive MAC PDUs for the service flow including the SPMH several times [S1404].

At the step of S1404, the SPMH can be selected from one of SPMHs which are described at the tables 2, 6, or 7 or SPMHs configured according to the embodiments of the present invention.

In case of using a SPMH or an advanced generic MAC header according to one embodiment of the present invention, the AMS receives a MAC PDU including the corresponding MAC header, identifies a flow carrying the corresponding MAC PDU via 'Flow ID' included in AAI_DSA-REQ message, and then obtains MAC header information of the MAC header used by the corresponding flow. Therefore, the AMS confirms a MAC header used by a corresponding flow via 'Flow ID' of a MAC header included in a next-transmitted MAC PDU and is then able to perform a processing process on the corresponding MAC PDU.

The MAC header type negotiation procedure performed via AAI_DSA-REQ/RSP messages in the embodiments of the present invention described with reference to FIG. 14 is identically applicable to a procedure performed in case of changing a dynamic service flow. In this case, the ABS and the AMS enable indication information on a MAC header type to be included as a service flow parameter in the course of exchanging AAI_DSC-REQ/RSP messages.

Thus, the above-configured SPMH according to one of embodiments of the present invention can be transmitted from a transmitting stage in a wireless communication system to a receiving stage in a manner of being included in a MAC PDU. In the following description, one example of a transmitting device (transmitter) for generating a MAC PDU including a MAC header according to one of embodiments of the present invention is described with reference to FIG. 15 as follows.

Figure 15:
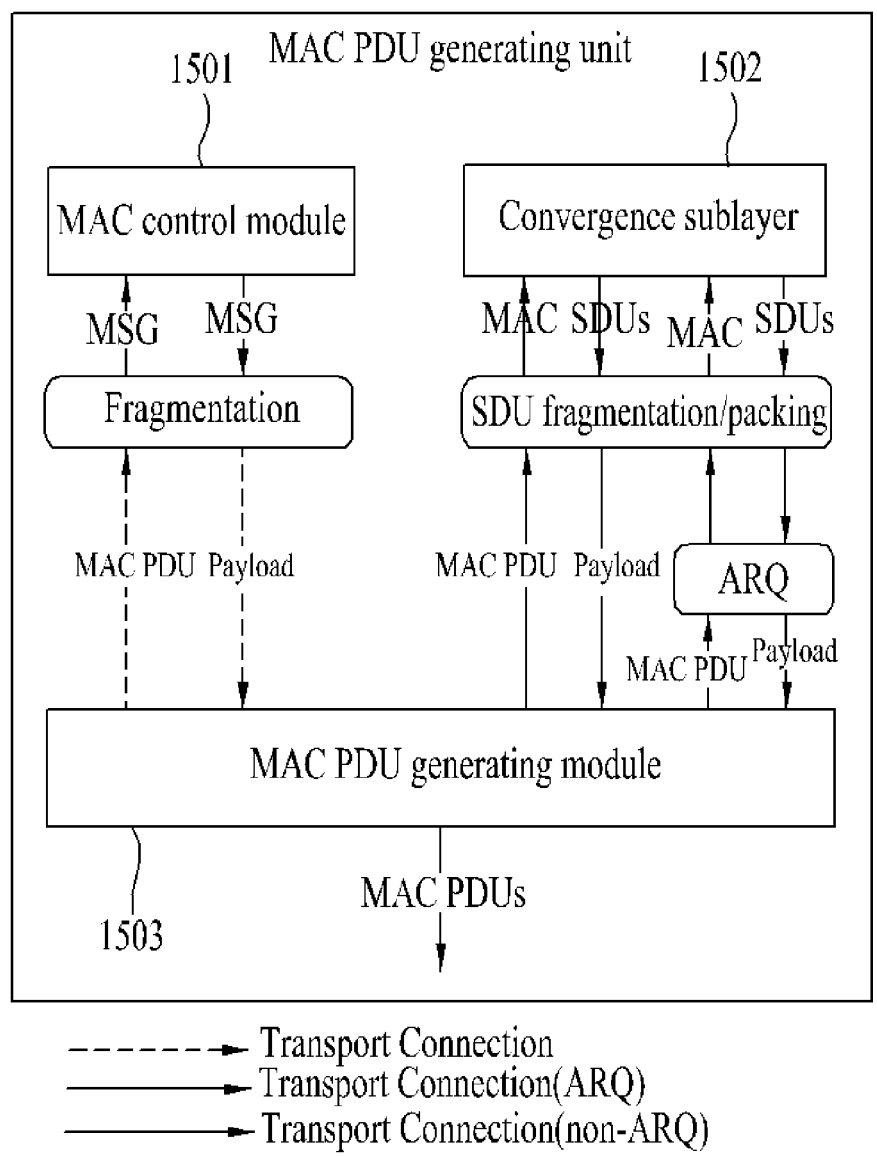
FIG. 15 is a diagram for one example of a MAC PDU generating unit in a transmitting device according to another embodiment of the present invention.

FIG. 15 is a diagram for one example of a MAC PDU generating unit in a transmitting device according to another embodiment of the present invention. In particular, FIG. 15 shows a process for constructing a MAC PDU used for ARQ connection, non-ARQ connection or control connection.

Referring to FIG. 15, a MAC PDU generating unit in a transmitting device (or, a transmitting end) can include a MAC control module 1501, a convergence sublayer 1502 and a MAC PDU generating module 1503.

MAC control messages generated from the MAC control module 1501 are fragmented into MAC PDU accompanied by a payload and can be then delivered to the MAC PDU generating module 1503. Moreover, control information required for generating a signaling header can be transmitted to the MAC PDU generating module 1503 as well.

The convergence sublayer 1502 performs a function of converting or mapping data, which is to be transmitted, to MAC SDU. In particular, the convergence sublayer 1502 classifies MAC SDUs into a MAC SDU to transmit and a transmitted MAC SDU. Once related to a specific MAC connection, at least one upper layer PDU should be compressed into a type of MAC SDU (MAC service data unit). This SDU to enter a network can be classified by the convergence sublayer 1502 into at least one set according to a prescribed mapping reference. The convergence sublayer is able to perform header compression on at least one header included in the generated MAC SDU. The convergence sublayer 1502 delivers the MAC SDU to transmit to the MAC PDU generating module 1503 and is able to provide information (e.g., length information, etc.) required for the header generation of the MAC PDU to transmit as well.

The at least one MAC SDU generated by the convergence sublayer 1502 is converted to a MAC PDU payload via fragmentation or packing. The converted at least one MAC PDU payload is then delivered to the MAC PDU generating module. In this case, the MAC PDU payload can be classified according to a case of applying ARQ or a case of not applying ARQ.

The MAC PDU generating module 1503 constructs the MAC PDU including the MAC PDU payload delivered from the MAC control module 1501 or the convergence sublayer 1502 and is able to include a MAC header generating unit and a multiplexer. In this case, a MAC header generated by the MAC header generating unit can include at least one of a generic MAC header described with reference to Table 1, a SPMH described with reference to Table 2 and one of SPMHs according to one embodiment of the present invention described with reference to FIGS. 6 to 13.

Meanwhile, the multiplexer generates and outputs MAC PDU by multiplexing the received MAC header and MAC SDUs received in order under the control of the header generating unit.

In doing so, the MAC PDU generating module 1503 is able to perform encryption on the MAC PDU. In particular, the MAC PDU generating module 1503 further attaches PN and ICV to the generated MAC PDU or is able to attach CRC to the generated MAC PDU.

Afterwards, the generated MAC PDU is generated into at least one contiguous MAC PDU, is delivered to a physical layer, and is then externally transmitted.

Figure 16:
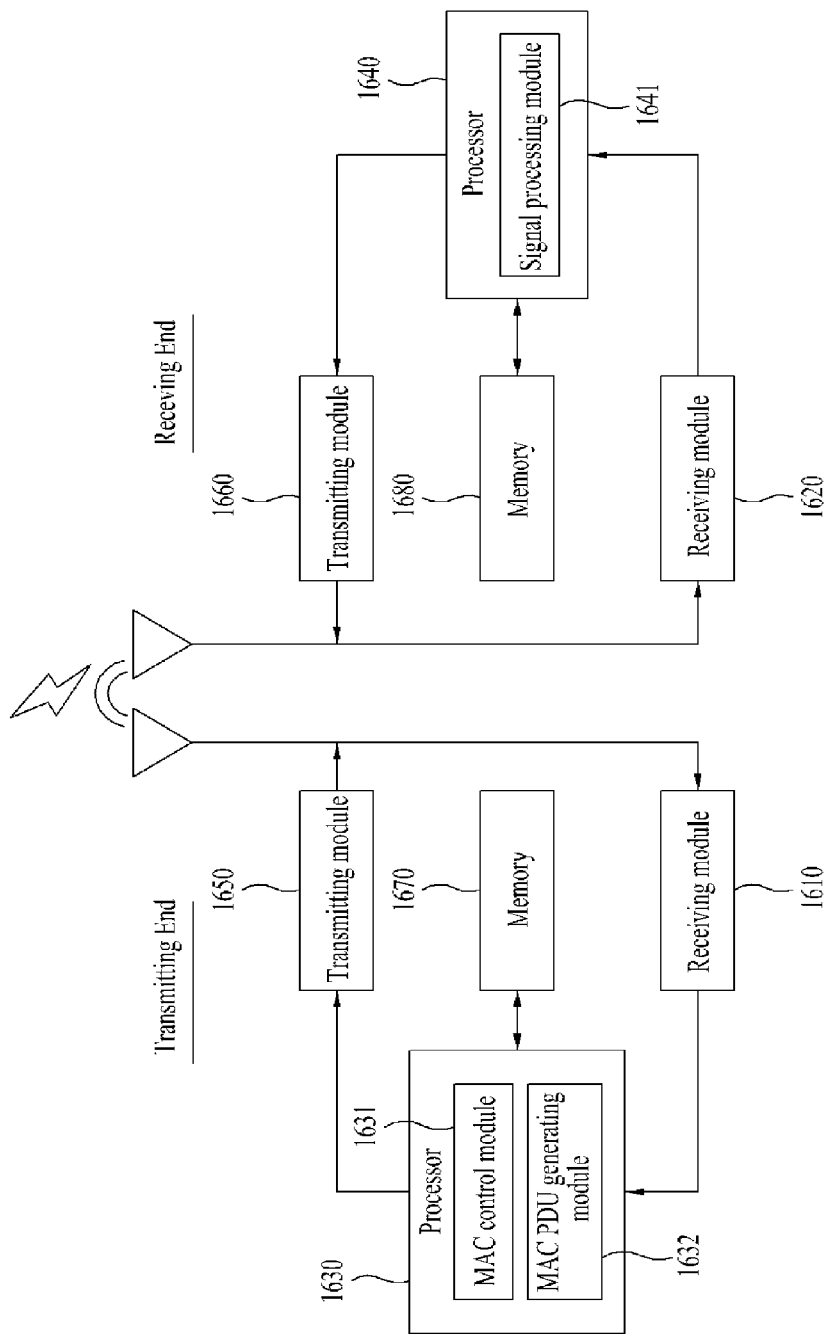
FIG. 16 is a block diagram for describing a mobile station and a base station according to a further embodiment of the present invention for performing the above described embodiments of the present invention.

FIG. 16 is a block diagram for describing an advanced mobile station (AMS) and an advanced base station (ABS)

according to a further embodiment of the present invention for performing the above described embodiments of the present invention.

First of all, the AMS works as a transmitting end in uplink and is able to work as a receiving end in downlink. The ABS works as a receiving end in uplink and is able to work as a transmitting end in downlink. In particular, each of the AMs and the ABS includes a transmitter and a receiver for transmission of information and/or data (i.e. MAC PDU).

Each of the transmitting end and the receiving end can include a processor, a module, a part and/or a means for performing embodiments of the present invention. In particular, each of the transmitting end and the receiving end can include a module (means) for encrypting a message, a module for interpreting the encrypted message, an antenna for exchanging the messages and the like.

Referring to FIG. 16, a left side indicates a configuration of a transmitting end, while a right side indicates a configuration of a receiving end. Each of the transmitting end and the receiving end includes an antenna, a receiving module 1610/1620, a processor 1630/1640, a transmitting module 1650/1660, and a memory 1670/1680.

The antenna includes a receiving antenna performing a function of receiving a radio signal externally and then delivering the received radio signal to the receiving module 1610/1620 and a transmitting antenna externally transmitting a signal generated from the transmitting module 1650/1660. In case that a multiple-antenna (MIMO) function is supported, at least two antennas can be provided.

The receiving module 1610/1620 reconstructs the radio signal received externally via the antenna into original data in a manner of performing decoding and demodulation on the received radio signal and is then able to deliver the reconstructed original data to the processor 1630/1640. Alternatively, the receiving module and the antenna can be represented as a receiving unit configured to receive a radio signal instead of being separated from each other, as shown in FIG. 16.

The processor 1630/1640 generally controls overall operations of the mobile/base station. In particular, the processor 1630/1640 is able to perform a control function for performing the above-described embodiments of the present invention, a MAC (medium access control) frame variable control function according to service characteristics and propagation environment, a handover function, an authentication function, an encryption function and the like.

The transmitting module 1650/1660 performs prescribed coding and modulation on a signal and/or data, which is scheduled by the processor 1630/1640 and will be then transmitted externally, and is then able to deliver the coded and modulated signal and/or data to the antenna. Alternatively, the transmitting module and the antenna can be represented as a transmitting unit configured to transmit a radio signal instead of being separated from each other, as shown in FIG. 16.

The memory 1670/1680 can store programs for processing and control of the processor 1630/1640 and is able to perform a function of temporarily storing input/output data (e.g., in case of the mobile station, UL grant allocated by the base station, system information, station identifier (STID), a flow identifier (FID), an action time, region allocation information, frame offset information, etc.). And, the memory 1670/1680 can include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

The processor 1630 of the transmitting end performs overall control operations on the transmitting end and is able to include a MAC control module 1631 configured to control a MAC layer for a service connection to the receiving end and the like and a MAC PDU generating module 1632 configured to generate MAC PDU.

The MAC control module 1631 generates a MAC control message for controlling a MAC layer and then controls the MAC layer through a relevant message exchange with the receiving end. In doing so, as mentioned in the foregoing description with reference to FIG. 14, the MAC control module 1631 is able to generate a service connection request message including a parameter of a MAC header type to be used for a corresponding service flow in case of a service connection establishment. In this case, the parameter of the MAC header type is determined by the MAC control module 1631 or can be determined based on information received from the MAC PDU generating module 1632. Moreover, since the MAC PDU generating module 1632 corresponds to the MAC PDU generating unit described with reference to FIG. 15, the redundant description shall be omitted from the following description.

The receiving end receives a service connection request message sent by the transmitting end via the receiving module 1620 and then forwards the received message to the processor 1640.

The processor 1640 of the receiving end performs overall control operations on the receiving end, determines whether to connect a service to the transmitting end in response to the received service connection request message, and then generates a response message in response to the received request message. Likewise, the processor 1640 is able to perform the procedure according to the embodiment of the present invention described with reference to FIG. 14.

Moreover, the processor 1640 is able to include a signal processing module 1641 configured to perform processing on a signal received from the transmitting end. In this case, the signal processing module 1641 is able to perform a signal processing procedure on a received MAC PDU according to a MAC header type of each of the embodiments of the present invention.

A mobile station used for embodiments of the present invention can include a low-power RF/IF (radio frequency/intermediate frequency) module as well as the MAC PDU generating unit. And, the mobile station can include means, modules, parts and/or the like for performing a controller function for performing the above-described embodiments of the present invention, a MAC (medium access control) frame variable control function according to a service characteristic and electric wave environment, a handover function, an authentication and encryption function, a packet modulation/demodulation function for data transmission, a fast packet channel coding function, a real-time modem control function, and the like.

A base station is able to transmit data received from an upper layer to a mobile station. The base station can include a low-power RF/IF (radio frequency/intermediate frequency) module. And, the base station can include means, modules, parts and/or the like for performing a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like.

INDUSTRIAL APPLICABILITY

Accordingly, the present invention is applicable to various wireless communication systems.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understood that an embodiment is configured by combining claims failing to have relation of explicit citation in the appended claims together or can be included as new claims by amendment after filing an application.

The invention claimed is:

1. A method for transmitting a media access control protocol data unit (MAC PDU) in a wireless access system, the method comprising:
    establishing, by a transmitting end with a receiving end, a connection associated with a service flow;
    constructing, by the transmitting end, the MAC PDU comprising a MAC header which is configured according to the connection; and
    transmitting the MAC PDU to the receiving end,
    wherein the MAC header is general MAC header (GMH) if the connection is associated with a general data packet transmission,
    wherein the MAC header is short-packet MAC header (SPMH) if the connection is associated with a small data packet transmission and non-ARQ transmission,
    wherein the GMH consists of a flow identifier (FID) filed identifying the connection used for the transmission of the MAC PDU, an extended header group presence indicator (EH) field indicating whether an extended header group is present following the GMH, and a length field indicating a length in bytes of the MAC PDU which includes the GMH and an extended header if present, and
    wherein a size of the FID field is 4 bits, a size of the EH field is 1 bit, a size of the length field is 11 bits, and total sizes of the GMH and the SPMH are the same as two bytes.

2. The method according to claim 1, wherein the SPMH consists of a flow identifier (FID) field identifying the connection used for the transmission of the MAC PDU, an extended header group presence indicator (EH) field indicating whether an extended header group is present following the SPMH, a length field indicating a length in bytes of the MAC PDU which includes the SPMH and an extended header if present and a sequence number (SN) field indicating a payload sequence number of the MAC PDU and incrementing by one for each MAC PDU.

3. The method according to claim 2, wherein the small data packet is a voice over internet protocol (VoIP) data packet which has fixed size and periodic transmission interval.

4. The method according to claim 2, wherein a size of the FID field is 4 bits;
    a size of the EH field is 1 bit;
    a size of the length field is 7 bits;
    a size of the SN field is 4 bits; and
    wherein total sizes of the GMH and the SPMH are the same as two bytes.

5. The method according to claim 4, wherein the SN field is used for an HARQ (hybrid-automatic retransmission request) scheme.

6. The method according to claim 1, further comprising:
    selecting the MAC header from the GMH, the SPMH and a MAC signaling header (MSH) based on the connection.

7. A transmitting end for transmitting a media access control protocol data unit (MAC PDU) in a wireless access system, the transmitting end comprising:
    a transmission module;
    a reception module; and
    a processor comprising a MAC PDU generating module for constructing the MAC PDU,
    wherein the transmitting end establishes a connection associated with a service flow with a receiving end;
    constructs the MAC PDU comprising a MAC header which is configured according to the connection by using the MAC PDU generating module; and
    transmits the MAC PDU to the receiving end,
    wherein the MAC header is general MAC header (GMH) if the connection is associated with a general data packet transmission,
    wherein the MAC header is short-packet MAC header (SPMH) if the connection is associated with a small data packet transmission and non-ARQ transmission,
    wherein the GMH consists of a flow identifier (FID) filed identifying the connection used for the transmission of the MAC PDU, an extended header group presence indicator (EH) field indicating whether an extended header group is present following the GMH, and a length field indicating a length in bytes of the MAC PDU which includes the GMH and an extended header if present, and
    wherein a size of the FID field is 4 bits, a size of the EH field is 1 bit, a size of the length field is 11 bits, and total sizes of the GMH and the SPMH are the same as two bytes.

8. The transmitting end according to claim 7, wherein the SPMH consists of a flow identifier (FID) field identifying the connection used for the transmission of the MAC PDU, an extended header group presence indicator (EH) field indicating whether an extended header group is present following the SPMH, a length field indicating a length in bytes of the MAC PDU which includes the SPMH and an extended header if present and a sequence number (SN) field indicating a payload sequence number of the MAC PDU and incrementing by one for each MAC PDU.

9. The transmitting end according to claim 8, wherein the small data packet is a voice over internet protocol (VoIP) data packet which has fixed size and periodic transmission interval.

10. The transmitting end according to claim 8, wherein a size of the FID field is 4 bits;
    a size of the EH field is 1 bit;
    a size of the length field is 7 bits;
    a size of the SN field is 4 bits; and
    wherein total sizes of the GMH and the SPMH are the same as two bytes.

11. The transmitting end according to claim 10, wherein the SN field is used for an HARQ (hybrid-automatic retransmission request) scheme.

12. The transmitting end according to claim 7, wherein the transmitting end further determines the MAC header from the GMH, the SPMH and a MAC signaling header (MSH) based on the connection.

* * * * *